United States Patent [19]

Bader et al.

[11] 4,150,018
[45] Apr. 17, 1979

[54] PROCESS FOR PRODUCING METAL COMPLEXED DYE DEVELOPERS

[75] Inventors: Henry Bader, Newton Centre; Michael H. Feingold, Randolph, both of Mass.

[73] Assignee: Polaroid Corporation, Cambridge, Mass.

[21] Appl. No.: 865,772

[22] Filed: Dec. 30, 1977

[51] Int. Cl.$^2$ .................. C09B 45/04; C09B 45/14; C09B 45/16; C09B 45/20

[52] U.S. Cl. .................. 260/147; 260/146 R; 260/148; 260/149; 260/150; 260/151; 260/345.2; 260/345.5; 260/438.5 R

[58] Field of Search .................. 260/146 R, 147, 148, 260/149, 150, 151, 438.5 R, 345.2, 345.5

[56] References Cited

U.S. PATENT DOCUMENTS

| | | | |
|---|---|---|---|
| 3,929,848 | 12/1975 | Bader et al. | 260/438.5 R |
| 3,970,616 | 7/1976 | Bader et al. | 260/147 |

FOREIGN PATENT DOCUMENTS

| | | | |
|---|---|---|---|
| 1216411 | 12/1970 | United Kingdom | 260/149 |
| 1216412 | 12/1970 | United Kingdom | 260/149 |

*Primary Examiner*—Floyd D. Higel
*Attorney, Agent, or Firm*—Gaetano D. Maccarone; John P. Morley

[57] ABSTRACT

A novel process which comprises the step of reacting a metal complexed dye of the formula:

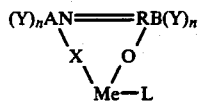

with a cyclized compound of the formula:

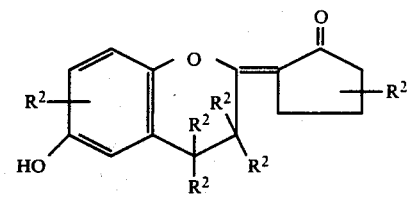

to form a metal complexed dye developer which is represented by the formula

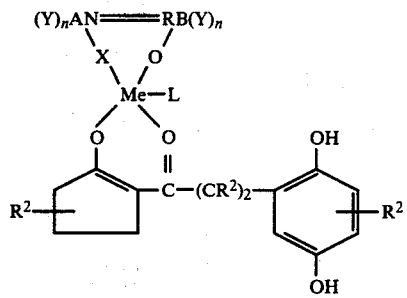

where A is a phenyl radical or a substituted phenyl radical; B is a phenyl or nitrogen containing heterocyclic radical or substituted derivatives of these radicals; R is N or CH, Y is a silver halide developing substituent; each n is 0 or 1; X is oxygen or an oxygen containing substituent; Me is a metal complexing atom; L represents a molecule(s) that can satisfy the coordination sphere of the Me atom and each $R^2$ can be hydrogen or any substituent which will not interfere with the functionality of the complexed cyclized compound as a silver halide developing agent. The process generally comprises mixing the reactants in a suitable solubilizing medium and heating the solution. The reaction product can be precipitated by the addition of acid to the reaction medium.

12 Claims, No Drawings

PROCESS FOR PRODUCING METAL COMPLEXED DYE DEVELOPERS

BACKGROUND OF THE INVENTION

The Field of the Invention

This invention relates to a process for providing metal complexed dyes and particularly to a process providing metal complexed dyes having a silver halide developing capability.

Metal complexed dyes which may have a silver halide developing capability are old and known to the art. Such dyes can be defined broadly by the following formula:

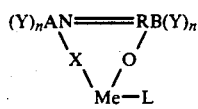

FORMULA A where A is a benzene or naphthalene radical which includes substituted derivatives of such radicals; B is a benzene, naphthalene or a nitrogen containing heterocyclic radical such as pyrazolone or pyrimidine radicals including substituted derivatives of such radicals; R is N or CH; Y is a silver halide developing substituent; each n is 0, 1 or 2; X is usually oxygen (O) but particularly if R is N, may be an oxygen containing substituent such as

or — alkyl —O—; Me is a metal complexing atom such as a transition metal, particularly a member of the first transition series, i.e., chromium, colbalt, nickel, iron, zinc, manganese, scandium, titanium and vanadium and, L represents a molecule or a moiety that can satisfy the coordination sphere of the Me atom and can be $H_2O$, $CH_3NCHO$-among others. Metal complexed dyes within the above formula are described in U.S. Pat. Nos. 3,551,406; 3,563,739; 3,597,200; 3,705,184; 3,752,836 and in commonly assigned U.S. Pat. Application Ser. No. 836,076 filed Sept. 23, 1977.

Particularly preferred metal complexed dyes are those described in such U.S. Pat. Nos. as 3,551,406; 3,563,739 and 3,705,184. These preferred metal complexed dyes conform to the following formula:

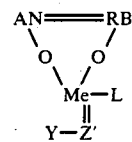

FORMULA B where A,R,B, Me and L are as defined before and Z' is a substantially colorless bidentate ligand radical and the silver halide developing substituent (Y) is attached to the ligand radical. Especially preferred metal complexed dyes of Formula B which have enjoyed extensive commercial success in diffusion transfer photographic products and processes are the magenta chrome complexed azo dye developer and the yellow chrome complexed azomethine dye developer of the following formulae:

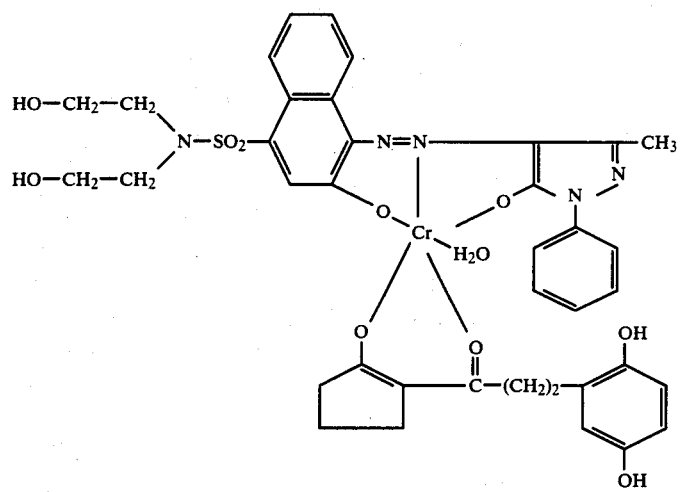

MAGENTA, CHROME COMPLEXED AZO DYE DEVELOPER

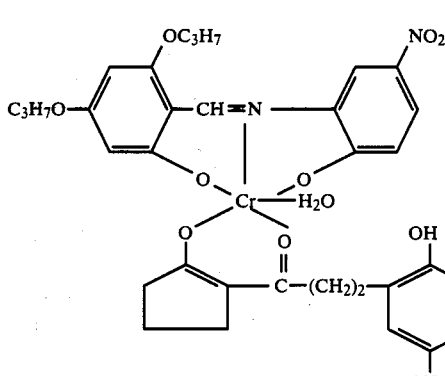

YELLOW, CHROME COMPLEXED AZOMETHINE DYE DEVELOPER

As can be seen from Formulae C and D, the bidentate ligand radical having the silver halide developing substituent, e.g., the "Y-Z'" of Formula B, is the same for both the azo and azo-methine dye. This particular "Y-Z" moiety, in its non-complexed form, is of the following formula.

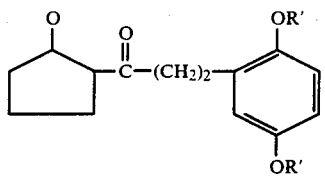 FORMULA E
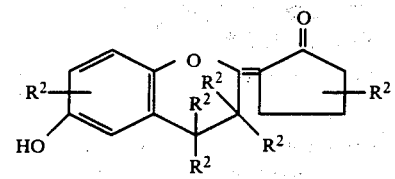 FORMULA G where each R' is H or a protective group that can be converted to H.

Normally in preparing chrome-complexed dye developers of Formulae B, C and D, the dye moiety, e.g.,

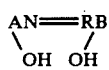

is reacted with a suitable chrome compound in manners known to the art. The chrome-complexed dye is then reacted with the bidentate ligand silver halide developer of Formula E to provide chrome-complexed dye developers of Formulae C and D. Usually, the bidentate ligand compound reacted with the chrome complexed dye has protective groups at the hydroxyphenyl sites and the protective groups are later removed in known manner to provide the hydroxyphenyl substituents. Details relating in ligands of Formula E and methods for making and using them can be found in U.S. Pat. Nos. 3,629,336; 3,772,368; 3,812,191; 3,903,169; 3,929,848; 3,970,616 and in commonly assigned U.S. Pat. application Ser. No. 784,933 filed Apr. 5, 1977.

The method described in U.S. Pat. No. 3,812,191 involves the preparation of a compound of Formula E of the following formula:

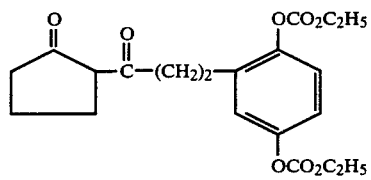 FORMULA F

More specifically, the method of U.S. Pat. No. 3,812,191 involves the preparation of a "protected" compound of Formula F, e.g., the compound [3-(2,5-dicathyloxyphenyl) propionyl] -2- cyclopentanone and the removal of the protecting groups — the cathyloxy groups — to provide a compound of Formula E.

According to the method disclosed in referenced U.S. Pat. No. 3,812,191, the cathyloxy groups of the [3-(2,5-dicathyloxyphenyl) propionyl)]-2-cyclopentanone are removed by saponifying the protected compound in a substantially non-aqueous, solubilizing medium comprising a solution of an alkali metal hydroxide in an alcohol and acidifying the saponified product to a pH of between about 6.0 to about 7.0 and preferably between about 6.5 to about 7.0. The controlled acidification of the saponified product is an important factor in the method of U.S. Pat. No. 3,812,191 leading to commercially acceptable yields of compounds of Formula E. For example, if the saponified product is acidified to a pH below 6.0 and particularly to a pH below 3.0, the predominant product is not the compound of Formula E — where each R' is H — but rather a cyclized compound of the following formula:

where each $R^2$ is usually hydrogen.

Essentially then, the process of U.S. Pat. No. 3,812,191 is designed to minimize formation of compounds of Formula G and maximize formation of compounds of Formula E.

According to the invention disclosed in commonly assigned U.S. Pat. Application Ser. No. 784,933 it has been found that formation of the cyclized compound of Formula G can provide certain advantages. For example according to the process of copending application, Ser. No. 784,933, compounds of Formula F can be converted to the cyclized compounds of Formula G of high purity and then the cyclized compound can be "opened up" with acids to provide extremely pure compounds of Formula E — where each R' is H.

The invention presents to the art a process for producing metal complexed dyes particularly of the type embraced by Formula B. Essentially, the invention involves the discovery that the cyclized compounds of Formula G can be reacted directly with metal complexed dyes to provide dye developers of the type illustrated by Formulae C and D.

SUMMARY OF THE INVENTION

Broadly, the process of the present invention involves the following illustrative reaction scheme:

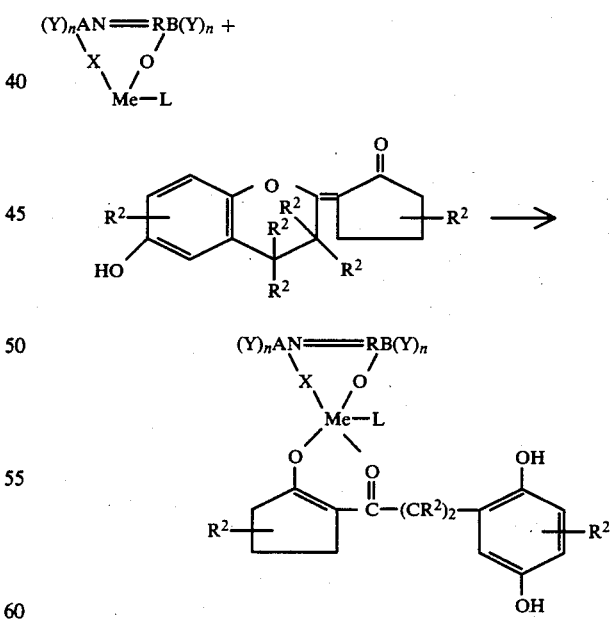

where as mentioned, each $R^2$ is usually hydrogen but can be any substituent which will not interfere with the functionality of the complexed ligand as a silver halide developer. Such substituents can include lower alkyl, lower alkoxy, etc.

The particularly preferred processes of the invention involve the following reaction scheme:

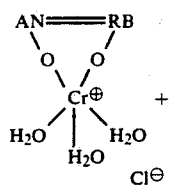

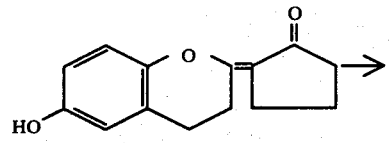

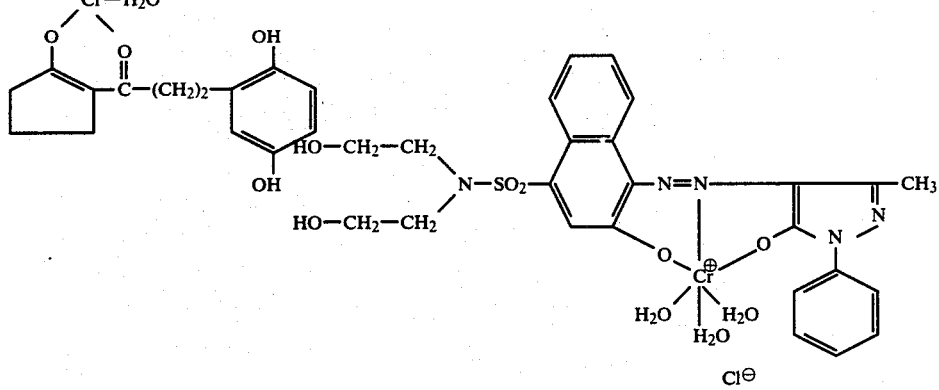

FORMULA H

It is believed that a small amount of compound of Formula H "opens up" initially and reacts with the chromed dye to form the dye developer. As the dye developer is formed, additional compound of Formula H "opens up" for reaction with chromed dye. This "opening up" is considered to be unexpected since specific acidic conditions such as those described in copending application Ser. No. 784,933 are normally required to effectively "open up" compounds of Formula H.

Essentially the processes of this invention involve mixing the reactants described above in a suitable solubilizing medium, heating the solution at elevated temperatures and precipitating the reaction product by the addition of acid to the reaction medium. Suitable solvents for the reactants involved are methyl cellosolve, methanol, propanol and isopropanol, among others. Elevated reaction temperatures are preferred and temperatures above 50° C. are particularly preferred. Suitable illustrative temperatures are between about 70° to about 120° C. with times of heating varying between about 2 to about 7 hours. Strong mineral acids are preferred for precipitating the reaction product from the reaction medium. For example, a 1% aqueous hydrochloric acid solution has been suitably employed for the precipitation.

Additional details for making and using the invention will be apparent from the following illustrative Examples.

EXAMPLE 1

This Example involves the preparation of the magenta chrome complexed azo dye developer of Formula C. The preparation involves a reaction between the compounds of Formula H and Formula I below.

FORMULA H

FORMULA I

A preparation for the cyclized compound of Formula H is described in U.S. Pat. No. 3,812,191 particularly in Example 2. Other procedures for preparing cyclized compounds of Formula H are described in U.S. patent application Ser. No. 784,933. A preparation for the chromed azo dye of Formula I is described in U.S. Pat. No. 3,970,616 particularly in Example 1.

A solution of 2.6 g (0.012 mole) of the cyclized compound of Formula H in 100 mls of methylcellosolve was added over a period of 30 minutes to a solution at 100° C. containing 6.5 g (0.010 mole) of the chromed magenta dye of Formula I, 75 mls of methylcellosolve and 2.8 g (0.015 mole) of tri-n-butylamine. The solution was then heated at 100° C. for four hours. The reaction product was precipitated by the addition of about 400 mls of 1% aqueous hydrochloric acid. After filtration and air drying, 7.7 g of the chrome complexed magenta dye developer of Formula C were obtained.

EXAMPLE 2

This Example involves the preparation of the yellow chrome complexed azomethine dye developer of Formula D. The preparation involves a reaction between the compounds of Formula H and J below:

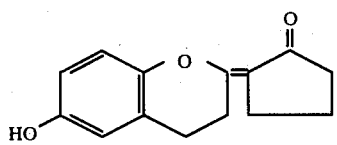

FORMULA H

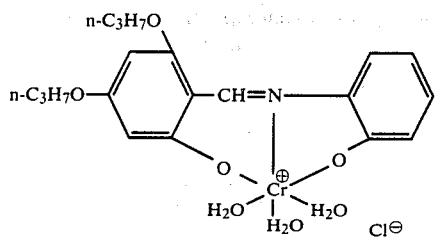

FORMULA J

The chrome complexed azo methine dye of Formula J is prepared according to the procedures described in U.S. Pat. No. 3,597,200 and U.S. Pat. No. 3,929,848.

A solution of 2.32 g (0.01 mole) of 96.34% purity cyclized compound of Formula H and 1.85 g (0.01 mole) of tri-n-butylamine in 40 mls of methylcellosolve was added dropwise at 100° C. to a stirred solution of 5.13 g (0.01 mole) of the chrome-complexed yellow dye of Formula J in 40 mls of methylcellosolve. The solution was then stirred at 100° C. for about four hours. The reaction product was then precipitated by the addition of 250 mls 1% aqueous hydrochloric acid solution. The solid precipitate was filtered and washed with 100 mls of water. Yield of product was 5.7 g. Analysis of the product by TLC, electrophoresis and visible absorption established the presence of the chrome-complexed yellow dye of Formula D.

The process of this invention presents distinct advantages. For example, as mentioned, usually a protected derivative of the compound of Formula E is reacted with the chrome-complexed dyes and the protective groups are removed later to provide the dihydroxyphenyl silver halide developing substituents. However, by reacting the cyclized compound of Formula G with the metal complexed dyes, the subsequent removal of protecting groups is avoided. Instead, the cyclized compound is "opened up" to directly provide a metal complexed ligand having the desired dihydroxy phenyl substituents. Also, the cyclized compounds of Formula G are highly crystalline and crystalize well from a wide variety of organic solvents and the cyclized compounds have high and well defined melting points (203 – 206° C when $R^2$ = H). Accordingly, the use of the highly purified cyclized compounds for the metal complexing reaction - rather than compounds of Formulae E — presents to the art a novel process of improved overall efficiency for obtaining products of the metal-complexing reaction.

Since certain changes can be made in the above description of the process without departing from the spirit and scope of the invention defined in the claims, it is intended that all matter contained in the above description shall be interpreted as illustrative and not in a limiting sense.

What is claimed is:

1. A process for reacting a metal complexed dye of the formula:

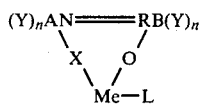

with a cyclized compound of the formula:

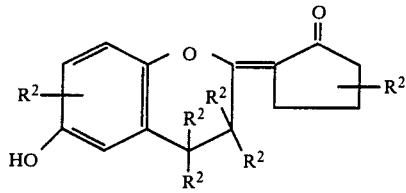

to provide a metal complexed compound of the formula:

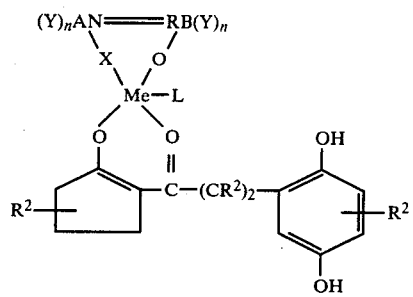

where A is a phenyl radical; B is a phenyl radical or a nitrogen containing heterocyclic radical; R is N or CH, Y is a silver halide developing substituent; each n is 0 or 1; X is oxygen or an oxygen containing substituent; Me is a metal complexing atom; L represents a molecule(s) that can satisfy the coordination sphere of the Me atom and each $R^2$ can be hydrogen or any substituent which will not interfere with the functionality of the complexed cyclized compound as a silver halide developing agent which comprises dissolving the reactants in a solubilizing medium and heating the solution.

2. A process for reacting a metal complexed dye of the formula:

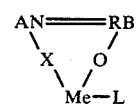

with a cyclized compound of the formula:

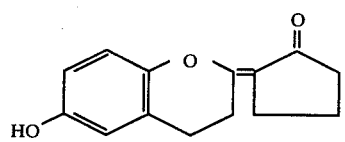

to provide a metal complexed compound of the formula:

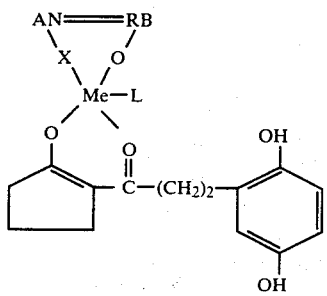

where A is a phenyl radical; B is a phenyl radical or a nitrogen containing heterocyclic radical; R is N or CH; X is oxygen or an oxygen containing substituent; Me is a metal complexing atom and L represents a molecule(s) that can satisfy the coordination sphere of the Me atom which comprises dissolving the reactants in a solubilizing medium and heating the solution.

3. A process of claim 2 where R is N and X is oxygen or

or -alkyl—O—.

4. A process of claim 2 where R is CH and X is oxygen.

5. A process of claim 2 where Me is chromium.

6. A process of claim 2 where said metal complexed dye is of the formula:

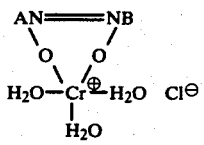

7. A process of claim 2 wherein said metal complexed dye is of the formula:

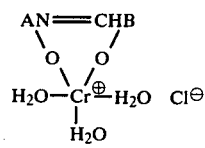

8. A process of claim 2 where said metal complexed dye is of the formula:

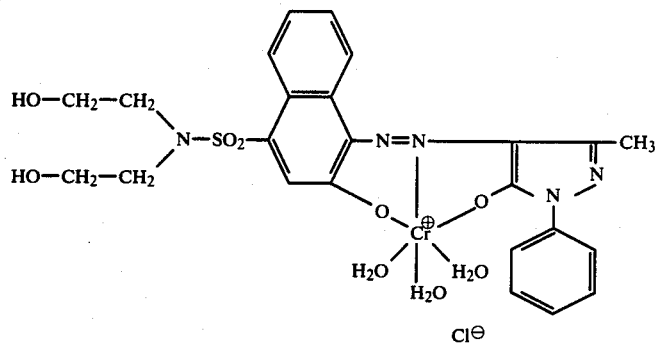

9. A process of claim 2 where said metal complexed dye is of the formula:

10. The process as defined in claim 2 and further including the step of precipitating said metal complexed compound by adding a mineral acid to the solution.

11. The process as defined in claim 2 wherein said solution is heated to a temperature in the range of from about 50° C. to about 120° C.

12. The process as defined in claim 11 wherein said solution is heated to a temperature in the range of from about 70° C. to about 120° C.

* * * * *